United States Patent
Nakajima et al.

(10) Patent No.: US 9,923,889 B2
(45) Date of Patent: Mar. 20, 2018

(54) DATA PROCESSING SYSTEM, DATA PROCESSING APPARATUS AND LOG IN METHOD

(71) Applicants: Masato Nakajima, Tokyo (JP); Hiroki Ohzaki, Kanagawa (JP); Yasuharu Fukuda, Tokyo (JP); Shigeki Kashiyama, Tokyo (JP)

(72) Inventors: Masato Nakajima, Tokyo (JP); Hiroki Ohzaki, Kanagawa (JP); Yasuharu Fukuda, Tokyo (JP); Shigeki Kashiyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 134 days.

(21) Appl. No.: 14/919,897

(22) Filed: Oct. 22, 2015

(65) Prior Publication Data
US 2016/0127349 A1    May 5, 2016

(30) Foreign Application Priority Data
Oct. 31, 2014    (JP) .................. 2014-223358

(51) Int. Cl.
*H04L 29/06*    (2006.01)
(52) U.S. Cl.
CPC .................. *H04L 63/083* (2013.01)
(58) Field of Classification Search
None
See application file for complete search history.

(56) References Cited

U.S. PATENT DOCUMENTS

| 8,090,945 B2 * | 1/2012 | Singhal ........... G06F 21/32 713/168 |
| 8,707,400 B2 * | 4/2014 | Buss ............... G06F 21/31 726/5 |
| 8,760,679 B2 | 6/2014 | Watanabe |

(Continued)

FOREIGN PATENT DOCUMENTS

| JP | 2013-178768 | 9/2013 |
| JP | 2014-148063 | 8/2014 |

OTHER PUBLICATIONS

Carey, Nathan; Mohay, George; Clark, Andrew. Attack Signature Matching and Discovery in Systems Employing Heterogeneous IDS. Proceedings, 19th Annual Computer Security Applications Conference. Pub. Date: 2003. http://ieeexplore.ieee.org/stamp/stamp.jsp?arnumber=1254329.*

(Continued)

*Primary Examiner* — Jeremiah Avery
(74) *Attorney, Agent, or Firm* — IPUSA, PLLC

(57) ABSTRACT

A data processing system including a data processing apparatus, includes a user data storing unit that stores user data of a user who uses a first service, the user data including first authentication data used for logging in the first service and user specifying data; a determining unit that determines, when the user who uses the first service sets second authentication data used for logging in a second service different from the first service, user specifying data usable as the second authentication data from the user specifying data included in the user data; and a management unit that sets the user specifying data determined to be usable as the second authentication data in the user data of the user who uses the first service as the second authentication data, and manages the user data as user data of the user who uses the first service and the second service.

8 Claims, 11 Drawing Sheets

(56) References Cited

U.S. PATENT DOCUMENTS

| | | | | |
|---|---|---|---|---|
| 2002/0087892 A1* | 7/2002 | Imazu | .................... | G06F 21/31 726/6 |
| 2004/0172558 A1* | 9/2004 | Callahan | ................ | H04L 63/08 726/2 |
| 2006/0020812 A1* | 1/2006 | Steinberg | ................ | G06F 21/31 713/181 |
| 2008/0034411 A1* | 2/2008 | Aoyama | ................ | G06F 21/305 726/5 |
| 2008/0168545 A1* | 7/2008 | Inoue | .................... | G06F 21/41 726/6 |
| 2008/0263642 A1* | 10/2008 | Jerez | .................... | G06F 21/34 726/6 |
| 2009/0029766 A1* | 1/2009 | Lutnick | ................... | G07F 17/32 463/29 |
| 2009/0327397 A1* | 12/2009 | Chen | .................... | G06F 17/243 709/202 |
| 2010/0050247 A1* | 2/2010 | Hashimoto | ........... | G06F 21/335 726/10 |
| 2012/0011577 A1* | 1/2012 | Mashimo | ................ | G06F 21/31 726/7 |
| 2013/0036458 A1* | 2/2013 | Liberman | ............. | H04L 9/3231 726/6 |
| 2013/0036459 A1* | 2/2013 | Liberman | ............. | H04L 9/0866 726/6 |
| 2014/0189808 A1* | 7/2014 | Mahaffey | .............. | H04L 63/083 726/4 |
| 2015/0347683 A1* | 12/2015 | Ansari | ................. | G06F 19/322 726/7 |

OTHER PUBLICATIONS

Chandra, Vikas; Aitken, Rob. Mobile Hardware Security. 2014 IEEE Hot Chips 26 Symposium (HCS). Pub. Date: 2014. http://ieeexplore.ieee.org/stamp/stamp.jsp?arnumber=7478796.*

Park, Beum Su; Choudhury, Amlan Jyoti; Kim, Tae Yong; Lee, Hoon Jae. A study on Password Input method using authentication Pattern and Puzzle. 2011 6th International Conference on Computer Sciences and Convergence Information Technology (ICCIT). Pub. Date: 2011. http://ieeexplore.ieee.org/stamp/stamp.jsp?arnumber=6316706.*

* cited by examiner

FIG.4

| TENANT ID |
|---|
| USER ID |
| CONTACT MAIL ADDRESS |
| LOG-IN MAIL ADDRESS |
| PASSWORD |
| USER NAME |
| DISPLAY LANGUAGE |
| TIME ZONE |
| STATUS |

FIG.6

USER DATA

* ARE REQUIRED ITEMS

| BASIC SETTINGS

USER NAME : hyuki.m

MAIN MAIL ADDRESS *: hyuki@xxx.cp.jp  [USE FOR LOG IN]

SUB-MAIL ADDRESS 1 : [USE FOR LOG IN]

SUB-MAIL ADDRESS 2 : [USE FOR LOG IN]

LAST NAME *: ○○

FIRST NAME *: ××

TENANT : △△△

ROLE : MANAGER

DISPLAY LANGUAGE *: JAPANESE ▶

TIME ZONE *: OSAKA, SAPPORO, TOKYO ▶

PASSWORD : [CHANGE]

FIG.7

| URL FOR CONFIRMATION WAS SENT |
| --- |
| URL for confirmation was sent to the designated mail address. Please open the mail and contact the displayed URL. |
| TO [USER DATA] |

FIG.8

USER DATA

* ARE REQUIRED ITEMS

| BASIC SETTINGS

USER NAME : hyuki.m

MAIN MAIL ADDRESS :* hyuki@xxx.cp.jp    USING FOR LOG IN [RELEASE] ← 202

SUB-MAIL ADDRESS 1 :

SUB-MAIL ADDRESS 2 :

LAST NAME :* ○○

FIRST NAME :* ××

TENANT : △△△

ROLE : MANAGER

DISPLAY LANGUAGE :* JAPANESE ▶

TIME ZONE :* OSAKA, SAPPORO, TOKYO ▶

PASSWORD : [CHANGE]

USER DATA

\* ARE REQUIRED ITEMS

BASIC SETTINGS — 400

MAIL ADDRESS : mn@nts.xxx.co.jp

LAST NAME :* [ ○○ ]

FIRST NAME :* [ × × ]

PASSWORD : [CHANGE]

and closes an unauthorized access. The image forming apparatus 12, the user terminal 11 and the like are connected to the network N2. The image forming apparatus 12 is an example of an electronic device by which a user experimentally or actually uses a service.

DATA PROCESSING SYSTEM, DATA PROCESSING APPARATUS AND LOG IN METHOD

BACKGROUND OF THE INVENTION

1. Field of the Invention

The present invention relates to a data processing system, a data processing apparatus and a log in method.

2. Description of the Related Art

Recently, service providing configurations have been increased in which a user only uses a necessary function only when it is necessary. For example, such configurations include a software using configuration called Software as a Service (SaaS) in which a user arbitrarily selects only a desired function and uses the service, a combination of computing resources on the INTERNET, a cloud computing that provides a service with a high added value to end users or the like.

In order to use such a service, a method is known in which user identification data that identifies a user is previously registered from an image forming apparatus, and the user logs in by the registered user identification data to use the service (see Patent Document 1, for example).

However, according to the method disclosed in Patent Document 1, it is necessary to register authentication data (user identification data) that identifies a user to use a service. Further, in order to use another service in which an authentication embodiment is different from that of the previous service, it is necessary to register authentication data that corresponds to the other service. Thus, according to the method disclosed in Patent Document 1, convenience of a user is not good because efforts or time are required for procedures for using the service.

Patent Document

[Patent Document 1] Japanese Laid-open Patent Publication No. 2014-148063

SUMMARY OF THE INVENTION

The present invention is made in light of the above problems, and provides a technique to improve convenience of a user.

According to an embodiment, there is provided a data processing system including a data processing apparatus, includes a user data storing unit that stores user data of a user who uses a first service, the user data including first authentication data used for logging in the first service and user specifying data; a determining unit that determines, when the user who uses the first service sets second authentication data used for logging in a second service different from the first service, user specifying data usable as the second authentication data from the user specifying data included in the user data; and a management unit that sets the user specifying data determined to be usable as the second authentication data in the user data of the user who uses the first service as the second authentication data, and manages the user data as user data of the user who uses the first service and the second service.

Note that also arbitrary combinations of the above-described elements, and any changes of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 4 is a view illustrating an example of user data of the embodiment;

FIG. 6 is a view illustrating an example of a first user data screen;

FIG. 7 is a view illustrating an example of a message indicating URL for confirmation is sent to a designated mail address;

FIG. 8 is a view illustrating an example of the first user data screen in which a release button is displayed;

FIG. 11 is a view illustrating an example of a second user data screen.

DETAILED DESCRIPTION OF THE PREFERRED EMBODIMENTS

Figure 1:
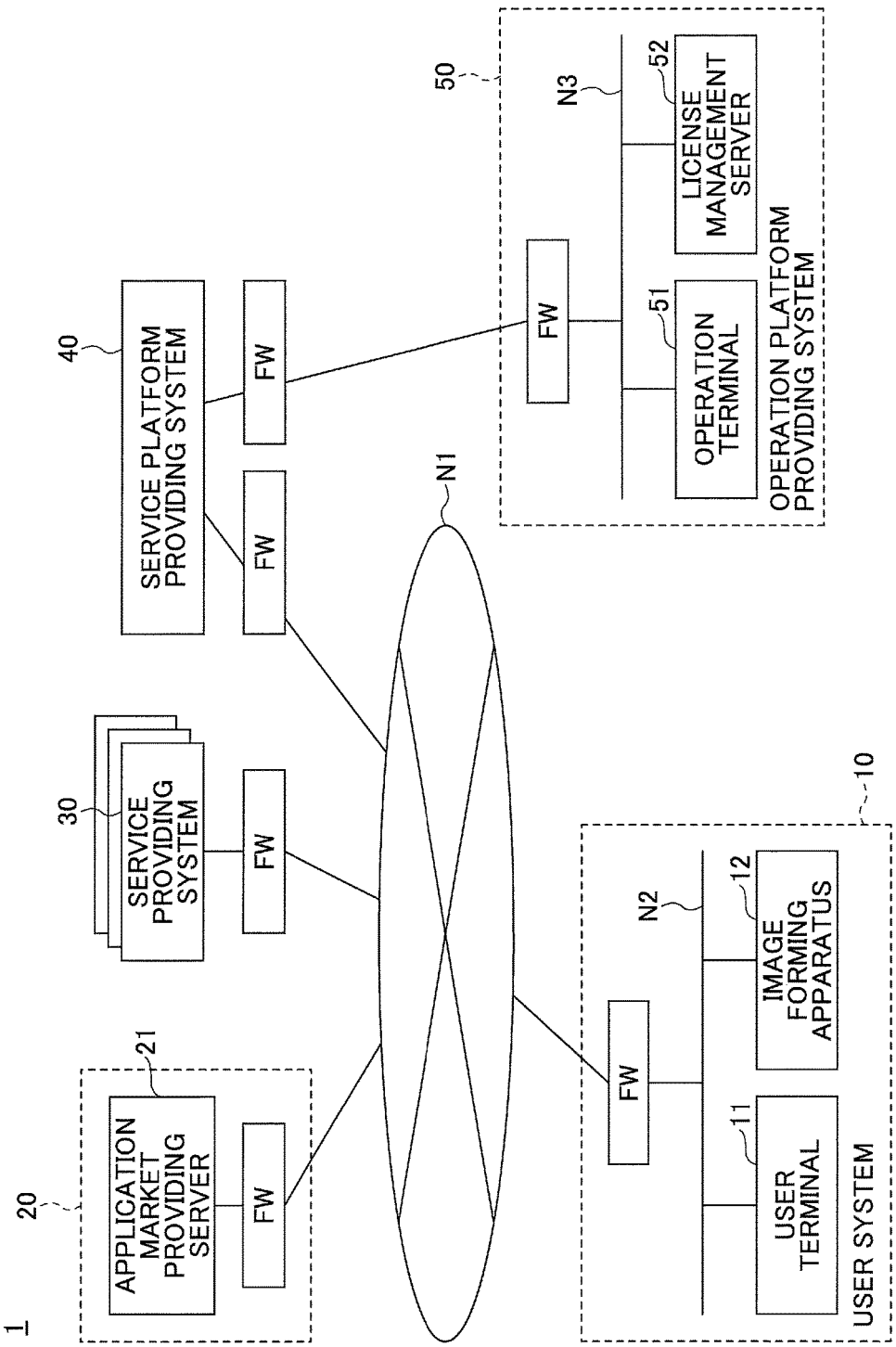
FIG. 1 is a view illustrating an example of a structure of a data processing system of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(System Structure)

FIG. 1 is a view illustrating an example of a structure of a data processing system 1 of the embodiment. The data processing system 1 illustrated in FIG. 1 includes a user system 10, an application market providing system 20, a service providing system 30, a service platform providing system 40 and an operation platform providing system 50.

The user system 10, the application market providing system 20, the service providing system 30 and the service platform providing system 40 are connected with each other via a network N1 such as the INTERNET or the like. The service platform providing system 40 and the operation platform providing system 50 are connected via a private line or the like.

The user system 10 includes an image forming apparatus 12 such as a multifunction peripheral or the like, a user terminal 11, a network N2 and the like. The network N2 is a private network and a firewall FW is provided between the network N2 and the network N1. The firewall FW detects The user terminal 11 may be actualized by a data processing apparatus on which a general Operating System (OS) or the like is mounted. The user terminal 11 includes a wireless communication means or a wired communication means. The user terminal 11 may be a terminal operable by a user such as a smartphone, a mobile phone, a tablet terminal, a Personal Computer (PC) or the like.

The image forming apparatus 12 is an apparatus that has an image forming function such as a multifunction peripheral or the like. The image forming apparatus 12 includes a wireless communication means or a wired communication means. The image forming apparatus 12 is an apparatus that performs a process regarding an image formation and on which a browser is mounted such as a multifunction peripheral, a copying machine, a scanner, a printer, a laser printer, a projector, an electronic whiteboard or the like, for example. Although an example is illustrated in FIG. 1 in which the user system 10 includes one user terminal 11 and one image forming apparatus 12, the user system 10 may include a plurality of them.

The application market providing system 20 includes an application market providing server 21. The application market providing server 21 is connected to the network N1 via a firewall FW. The application market providing server 21 may be actualized by one or more data processing apparatuses on each of which a general OS or the like is mounted.

The application market providing system 20 may be provided for each sales territory, each sales company or the like. The application market providing server 21 provides an application market screen such as a service list screen, an applying screen or the like to the user terminal 11 or the image forming apparatus 12, for example.

The service providing system 30 is connected to the network N1 via a firewall FW. The service providing system 30 provides various services to the user terminal 11 or the image forming apparatus 12. The service providing system 30 may be actualized by one or more data processing apparatuses on each of which a general OS or the like is mounted.

The services provided by the service providing system 30 may be services provided external service providers or the like, in addition to services provided by an administrator of the service platform providing system 40. The services provided by the service providing system 30 is a translation service or the like, for example. When using the translation service, a user of the image forming apparatus 12 may scan a manuscript to obtain an image data or the like, perform an OCR (optical character recognition) process on the obtained image data and send it to the service providing system 30. Then, the user may view a translated result by accessing the service providing system 30 via the user terminal 11, or may receive a translated result by an electronic mail or the like.

The service platform providing system 40 is connected to the network N1 via a firewall FW. The service platform providing system 40 may be actualized by one or more data processing apparatuses on each of which a general OS or the like is mounted.

The service platform providing system 40 has functions such as an authentication permission function, a tenant user management function, a license management function, an account registration function or the like, for example. The service platform providing system 40 receives a request to register an account or a request to log in from the user terminal 11 or the image forming apparatus 12. The service platform providing system 40 also receives a request to confirm an authentication ticket or request to obtain user data from the service providing system 30.

The operation platform providing system 50 includes an operation terminal 51, a license management server 52 and the network N3. The network N3 is a private network and a firewall FW is provided between the network N3 and the network N1. The operation terminal 51 and the license management server 52 are connected to the network N3. Each of the operation terminal 51 and the license management server 52 may be actualized by one or more data processing apparatuses on each of which a general OS or the like is mounted.

The operation terminal 51 includes a wireless communication means or a wired communication means. The operation terminal 51 may be a terminal operable by a work operator such as a smartphone, a mobile phone, a tablet terminal, a PC or the like. The work operator is capable of requesting issuance of a license from the operation terminal 51 to the license management server 52.

The license management server 52 has a function to manage licenses or the like. The license management server 52 receives a request of issuance of a license or the like from the service platform providing system 40 or the operation terminal 51. The structure of the data processing system 1 illustrated in FIG. 1 is just an example and the data processing system 1 may have another structure.

(Hardware Structure)

Figure 2:
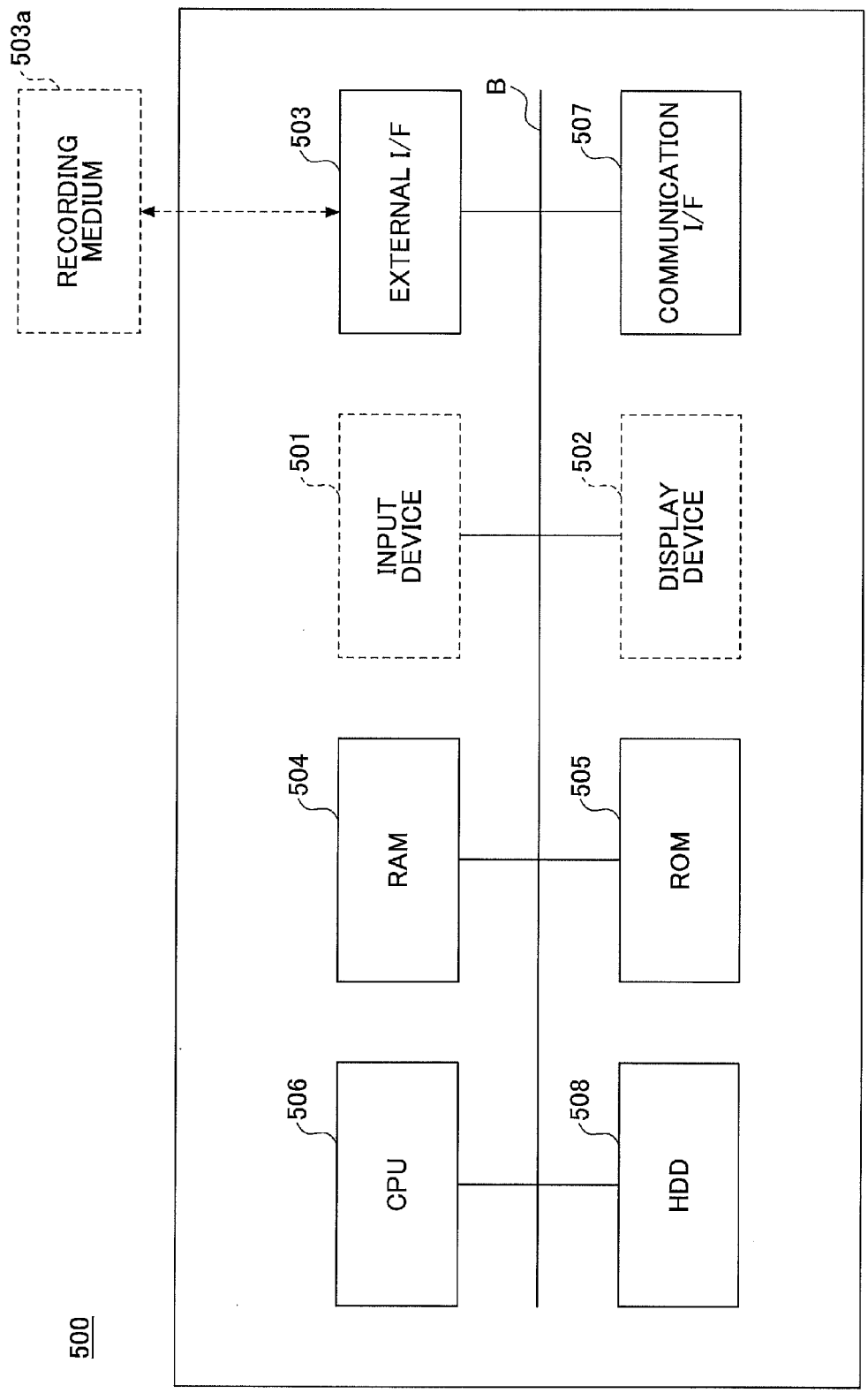
FIG. 2 is a view illustrating an example of a hardware structure of a computer of the embodiment.

FIG. 2 is a view illustrating an example of a hardware structure of a computer of the embodiment. Each of the user terminal 11, the application market providing server 21, the operation terminal 51 and the license management server 52 illustrated in FIG. 1 is actualized by a computer having a hardware structure as illustrated in FIG. 2, for example. Further, the data processing apparatus that actualizes each of the service providing system 30 and the service platform providing system 40 as illustrated in FIG. 1 is actualized by the computer having the hardware structure as illustrated in FIG. 2, for example.

The computer 500 illustrated in FIG. 2 includes an input device 501, a display device 502, an external I/F 503, a RAM (Random Access Memory) 504, a ROM (Read Only Memory) 505, a CPU (Central Processing Unit) 506, a communication I/F 507, a HDD (Hard Disk Drive) 508 and the like, and each of them is connected with each other via a bus B. The input device 501 and the display device 502 may be connected only when it is necessary.

The input device 501 includes a keyboard, a mouse or the like, and is used by a user to input various operation signals. The display device 502 includes a display or the like and displays a processed result by the computer 500.

The external I/F 503 is an interface for an external device. As the external device, a recording medium 503a or the like may be raised. With this configuration, the computer 500 can read and/or write data from and to the recording medium 503a via the external I/F 503. As the recording medium 503a, a flexible disk, a Compact Disk (CD), a Digital Versatile Disk (DVD), an SD Memory card, a Universal Serial Bus memory (USB memory) or the like may be raised.

The RAM 504 is a volatile semiconductor memory (storage device) that temporarily stores programs and data. The ROM 505 is a non-volatile semiconductor memory (storage device) that can store programs and data even when the switch is turned off. The ROM 505 stores programs and data such as a Basic Input/Output System (BIOS) that is executed when activating the computer 500, an OS setting, a network setting or the like.

The CPU 506 is an arithmetic unit that actualizes control and functions of the entirety of the computer 500 by reading out programs or data from the storage device such as the ROM 505, the HDD 508 or the like on the RAM 504 and executing the processes.

The communication I/F 507 is an interface that connects the computer 500 to the network N1, N2 or N3. With this configuration, the computer 500 can perform data communication via the communication I/F 507.

The HDD 508 is a non-volatile storage device that stores programs or data. The programs or data stored in the HDD 508 include an OS that is basic software for controlling the entirety of the computer 500, application software that provides various functions on the OS or the like, for example. Here, the computer 500 may include a Solid State Drive (SSD) instead of the HDD 55.

Each of the user terminal 11, the application market providing server 21, the operation terminal 51 and the license management server 52 of the embodiment is capable of actualizing the various processes, which will be explained later, by the hardware structure of the computer 500. Further, the data processing apparatus that actualizes each of the service providing system 30 and the service platform providing system 40 of the embodiment is capable of actualizing the various processes, which will be explained later, by the hardware structure of the computer 500.

(Service Platform Providing System)

Figure 3:
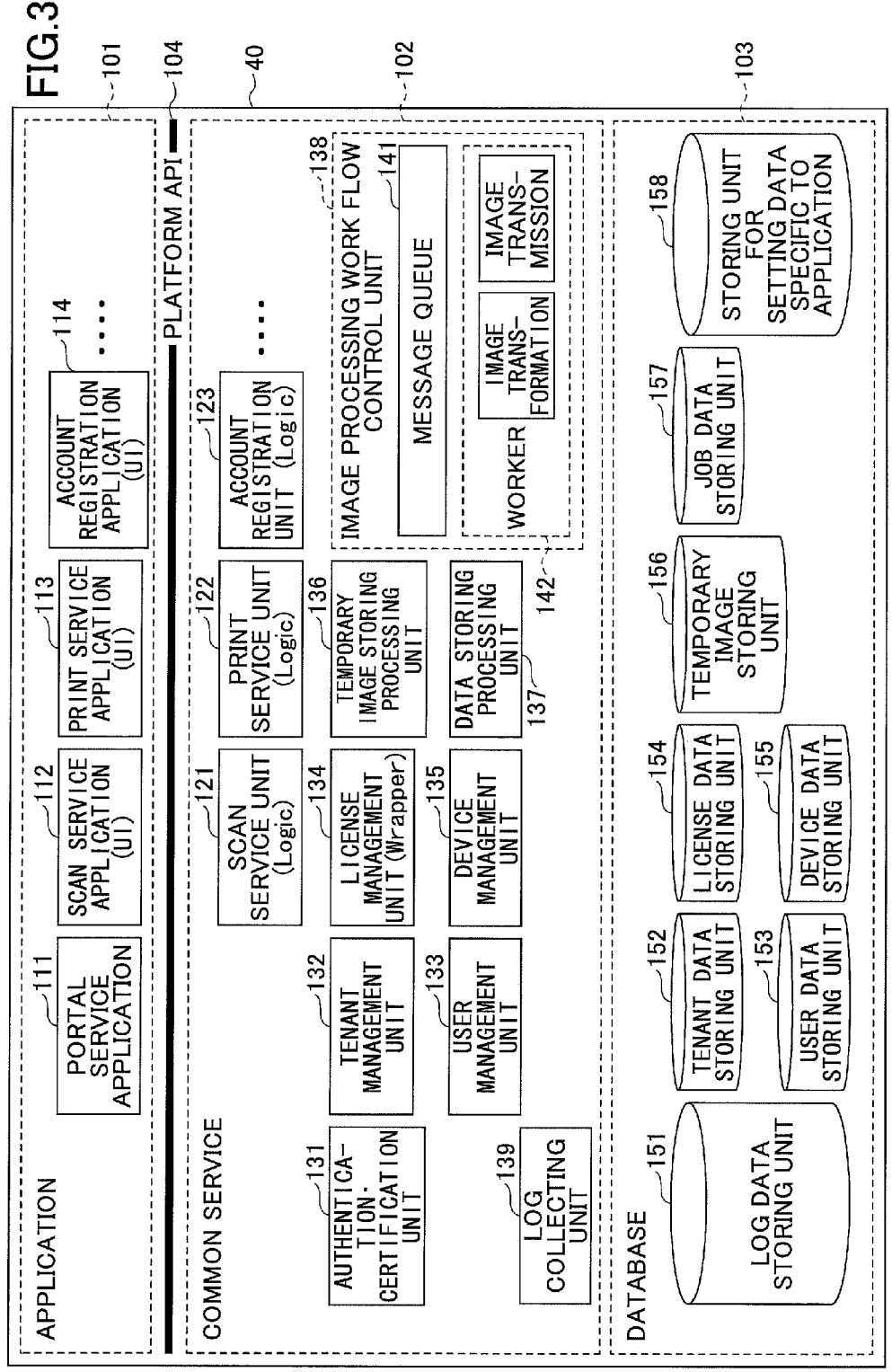
FIG. 3 is a process block diagram illustrating an example of a service platform providing system.

The service platform providing system 40 of the embodiment is actualized by a process block as illustrated in FIG. 3, for example. FIG. 3 is a process block diagram illustrating an example of the service platform providing system 40 of the embodiment. The service platform providing system 40 actualizes the process block as illustrated in FIG. 3 by executing a program.

The service platform providing system 40 illustrated in FIG. 3 actualizes application 101, a common service 102, a database (DB) 103 and a platform Application Programming Interface (API) 104.

The application 101 includes portal service application 111, scan service application 112, print service application 113 and account registration application 114, as an example.

The portal service application 111 is application that provides a portal service. The portal service provides a service that becomes an entrance to use the data processing system 1. The scan service application 112 is a UI (user interface) of application that provides a scan service.

The print service application 113 is a UI of application that provides a print service. The account registration application 114 is a UI of application that provides an account registration service. The application 101 may include another service application.

The UI of each of the scan service application 112, the print service application 113 and the account registration application 114 may include Native application or HTML/JavaScript (registered trademark) data that is displayed or executed at the user terminal 11 or the image forming apparatus 12. The Native application is a counterpart of Web application, and is a type of application whose main process is performed by the user terminal 11 or the image forming apparatus 12. The Web application is a type of application whose main process is performed by the service platform providing system 40.

The platform API 104 is an interface for the application 101 such as the portal service application 111 or the like to use the common service 102.

The platform API 104 is a previously defined interface provided for the common service 102 to receive a request from the application 101, and is configured by a function, a class or the like, for example. When the service platform providing system 40 is configured by a plurality of data processing apparatuses, the platform API 104 can be actualized by a Web API that can be usable via a network, for example.

The common service 102 includes a scan service unit 121, a print service unit 122, an account registration unit 123, an authentication•certification unit 131, a tenant management unit 132, a user management unit 133, a license management unit 134, a device management unit 135, a temporary image storing processing unit 136, a data storing processing unit 137, an image processing work flow control unit 138 and a log collecting unit 139. The image processing work flow control unit 138 includes a message queue 141 and one or more workers 142. The workers 142 actualize functions such as image transformation, image transmission and the like.

The database 103 includes a log data storing unit 151, a tenant data storing unit 152, a user data storing unit 153, a license data storing unit 154, a device data storing unit 155, a temporary image storing unit 156, a job data storing unit 157 and a storing unit 158 for setting data specific to application (hereinafter, referred to as "setting data storing unit 158").

The scan service unit 121 functions as a logic (API) of the scan service application 112. The print service unit 122 functions as a logic (API) of the print service application 113. The account registration unit 123 functions as a logic (API) of the account registration application 114.

The authentication•certification unit 131 authenticates and certificates based on a request to log in from the office device such as the user terminal 11, the image forming apparatus 12 or the like. The office device is a generic name of the user terminal 11, the image forming apparatus 12 and the like.

The authentication•certification unit 131 authenticates and certificates a user by accessing the user data storing unit 153, the license data storing unit 154 or the like, for example. Further, the authentication•certification unit 131 authenticates the image forming apparatus 12 or the like as a client by accessing the tenant data storing unit 152, the license data storing unit 154, the device data storing unit 155 or the like, for example.

The tenant management unit 132 manages tenant data stored in the tenant data storing unit 152. The user management unit 133 manages user data stored in the user data storing unit 153.

The license management unit 134 manages license data stored in the license data storing unit 154. The device management unit 135 manages device data stored in the device data storing unit 155. The temporary image storing processing unit 136 stores a temporary image in the temporary image storing unit 156 and obtains the temporary image from the temporary image storing unit 156. The data storing processing unit 137 stores data in the job data storing unit 157 or the like.

The image processing work flow control unit 138 controls a work flow regarding image processing based on a request from the application 101. The message queue 141 includes a queue that corresponds to a kind of a process. The image processing work flow control unit 138 inputs a message of a request regarding a process (job) to a queue that corresponds to a kind of the job.

The workers 142 monitor corresponding queues, respectively. Then, when a message is input in the respective queue, the worker 142 performs a process such as image transformation, image transmission or the like that corresponds to a kind of the respective job. The message input in the queue may be mainly read out by the worker 142 (Pull), or the queue may provide the message to the worker 142 (Push). The log collecting unit 139 stores collected log data in the log data storing unit 151, for example.

The log data storing unit 151 stores log data. The tenant data storing unit 152 stores tenant data. The user data storing unit 153 stores user data. The license data storing unit 154 stores license data. The device data storing unit 155 stores device data. The temporary image storing unit 156 stores a temporary image. The temporary image is a file or data such as a scan image or the like processed by the worker 142, for example.

The job data storing unit 157 stores information of request (job data) regarding the process (job). The setting data storing unit 158 stores setting data specific to the application 101.

The service platform providing system 40 functions as an integrated base that provides a common service such as authentication•certification, a work flow regarding image processing or the like, and a service group that provides application services such as a scan service, a print service and the like using a function of the integrated base.

The integrated base is configured by the common service 102, the database 103 and the platform API 104, for example. The service group is configured by the application 101, for example. As such, the service platform providing system 40 illustrated in FIG. 3 has a structure in which the service group and the integrated base are separated.

As the service platform providing system 40 illustrated in FIG. 3 has the structure in which the service group and the integrated base are separated, it is easy to develop the application 101 that uses the platform API 104. Further, with the service platform providing system 40 illustrated in FIG. 3, it is easy to develop the service providing system 30 that uses the platform API 104.

Here, the embodiment of classification of the process block of the service platform providing system 40 illustrated in FIG. 3 is just an example, and it is not essential to classify the application 101, the common service 102 and the database 103 by layers as illustrated in FIG. 3. For example, as long as it is possible to perform the processes of the service platform providing system 40, a layer relationship or the like illustrated in FIG. 3 is not limited to a specific structure.

(User Data)

Next, an example of the user data stored in the user data storing unit 153 of the service platform providing system 40 is explained. FIG. 4 is a view illustrating an example of the user data of the embodiment.

The user data illustrated in FIG. 4 includes data items such as "tenant ID", "user ID", "contact mail address", "log-in mail address", "password", "user name", "display language", "time zone", "status" or the like.

The "tenant ID" is data that specifies a group (organization) such as a company, a department or the like. The "tenant ID" is not limited to an idiom "tenant" and may be tenant data that identifies a contract, for example. The "tenant ID" is uniquely provided.

The "user ID" is data that specifies a user. The "contact mail address" is address data of one or more mail addresses used for contacting the user in a first service, for example. The "log-in mail address" is address data of a mail address used for logging in to a second service, for example. It is necessary for the log-in mail address to be unique.

The "user name" indicates a name of the user. The "display language" indicates a language by which the user name is displayed. Further, the "display language" indicates a language of a display in response to an access from a browser, a language of a mail body or the like. The "time zone" indicates standard time used by the user. The "status" indicates a status of the user.

The log-in mail address and the password illustrated in FIG. 4 are an example of data that specifies the user (user specifying data). The user specifying data may be data that identifies the user such as user ID, user name or the like instead of the log-in mail address. Further, the password is not essential. Here, the user ID managed by the same tenant ID is unique. The user IDs managed by different tenant IDs may overlap.

Further, for the user specifying data, data that identifies an electronic medium possessed by the user (an IC card, for example) may be used. As the electronic medium possessed by the user, an IC card, a mobile phone, a tablet terminal, an electronic book terminal or the like may be used. As the data that identifies the electronic medium, card ID, serial ID, telephone number of the mobile phone, profile data of the terminal or the like may be used. A plurality of kinds of data each identifies the electronic medium may be used in combination.

For example, under a status that the first authentication data (the tenant ID, the user ID and the password) used for logging in the first service is registered but the second authentication data (log-in mail address, password) for logging in the second service is not registered, the item of the log-in mail address is left blank in the user data illustrated in FIG. 4.

Further, for example, when the second authentication data is registered, the item of the log-in mail address is input and the log-in mail address is input in the item of the contact mail address to keep compatibility between the second service and the first service. As such, the user data illustrated in FIG. 4 is managed as user data of a user who uses the first service and the second service, for example.

(Sequence of Registration Process)

In the data processing system 1 as described above, when a user uses a service provided by the service providing system 30 via the user terminal 11 or the image forming apparatus 12, the user performs various settings to the service platform providing system 40 to request usage of the service providing system 30.

Here, an example of a process of registering the second authentication data (For example, log-in mail address) that is used for logging in the second service under a status that the first authentication data (the tenant ID, the user ID, the password, for example) that is used for logging in the first service provided by the service providing system 30 is already registered is explained.

Figure 5:
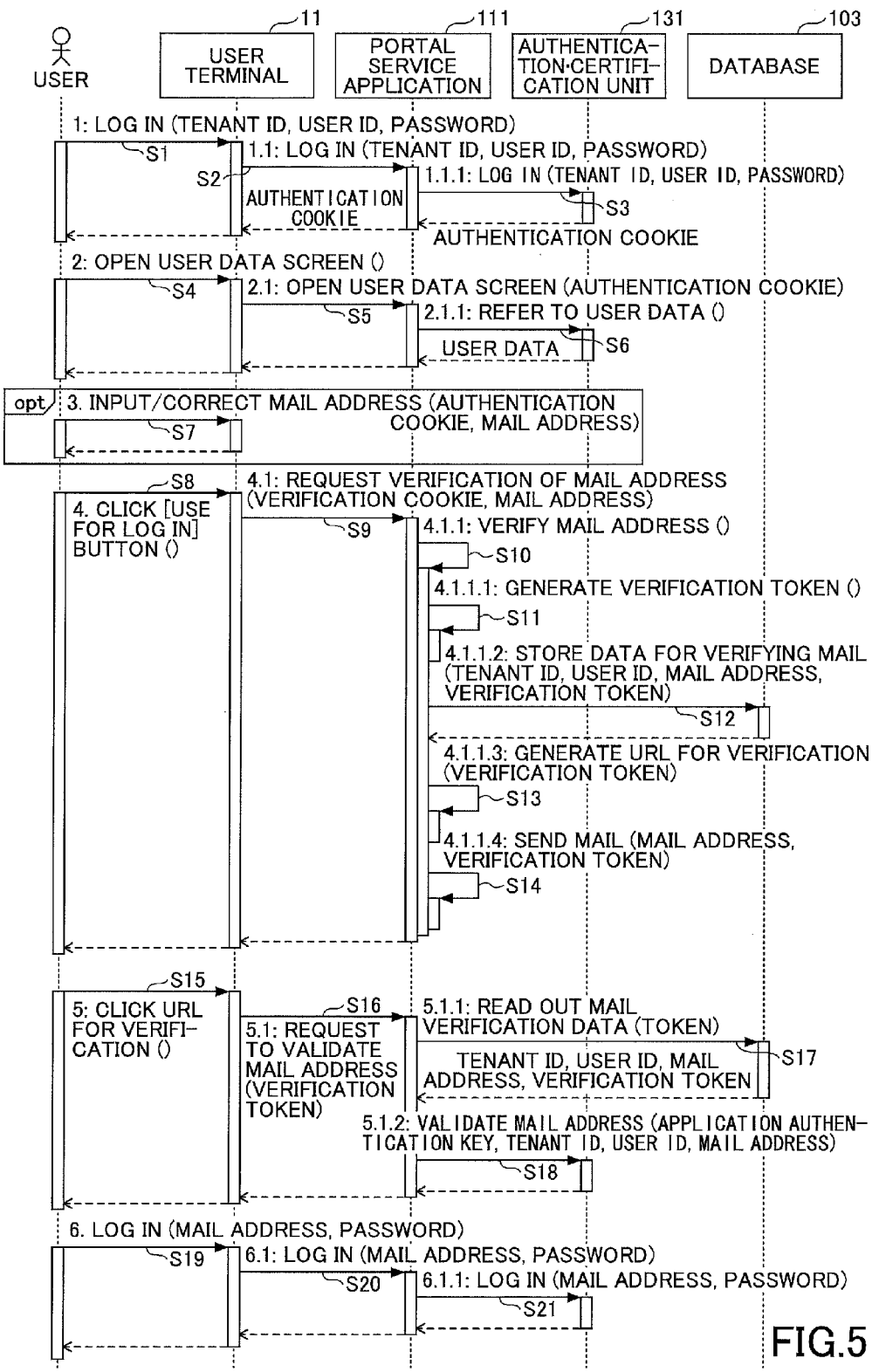
FIG. 5 is a sequence diagram illustrating an example of a process of registering a log-in mail address.

FIG. 5 is a sequence diagram illustrating an example of a process of registering a log-in mail address. The sequence illustrated in FIG. 5 is performed by the user terminal 11, and the portal service application 111, the authentication•certification unit 131 and the database 103 of the service platform providing system 40, for example.

First, a user selects the first service from an application list displayed in an application market screen, for example. Then, a log-in screen of the first service is displayed. Thereafter, as illustrated in FIG. 5, the user terminal 11 accepts, from the user, an input of the tenant ID, the user ID and the password as the first authentication data in the log-in screen of the first service (S1). The user terminal 11 requests the portal service application 111 of the service platform providing system 40 to log in by designating the tenant ID, the user ID and the password (S2).

At the service platform providing system 40, the portal service application 111 requests the authentication•certification unit 131 to log in using the tenant ID, the user ID and the password obtained from the user terminal 11 (S3). Here, the authentication•certification unit 131 authenticates the user using the tenant ID, the user ID and the password obtained in the process of S3. Then, when the user is successfully authenticated, the authentication•certification unit 131 sends an authentication cookie to the user terminal 11 via the portal service application 111.

Next, upon accepting, from the user, a request of displaying (opening) a first user data screen for displaying the user data of the user who uses the first service (S4), the user terminal 11 requests the portal service application 111 to open the first user data screen using the authentication cookie (S5). The portal service application 111 requests the authentication•certification unit 131 to refer to the user data (S6). Then, upon obtaining the user data of the user who uses the first service including the first authentication data from the authentication•certification unit 131, the portal service application 111 sends data for opening the first user data screen to the user terminal 11, for example.

Here, at the user terminal 11, by using the authentication cookie, it is possible to input or correct a log-in mail address which is an example of user specifying data usable as the second authentication data in the first user data screen.

When one or more contact mail addresses are previously registered, the user terminal 11 accepts, from the user, a selection of a contact mail address to be used as the log-in mail address among the registered contact mail addresses in the first user data screen (S8). The user terminal 11 requests the portal service application 111 to verify whether the selected contact mail address is usable as the log-in mail address using the authentication cookie and the selected contact mail address (S9).

The portal service application 111 verifies whether the selected contact mail address is usable as the log-in mail address (S10). In the process of S10, the portal service application 111 determines that the selected contact mail address is usable as the log-in mail address when the authentication•certification unit 131 determines that the selected contact mail address is unique by referring to the database 103, for example.

When it is determined that the selected contact mail address is usable as the log-in mail address, the portal service application 111 generates a verification token (S11).

Next, the portal service application 111 requests the database 103 to store mail verification data by designating the tenant ID, the user ID, the contact mail address determined to be usable as the log-in mail address and the verification token (S12). Here, in the process of S12, when the user is unique, UUID or the like may be used instead of the tenant ID and the user ID.

Next, after generating verification URL using the verification token generated in the process of S11 (S13), the portal service application 111 sends a mail including the verification URL to the contact mail address determined to be usable as the log-in mail address (S14). Here, when the contact mail address is not right address data, the user cannot receive the mail. Thus, by the process of S14, it is possible to prevent registering a wrong address as the log-in mail address.

Upon accepting, from the user, an access to the verification URL included in the mail (S15), the user terminal 11 requests the portal service application 111 to validate the log-in mail address (S16). The portal service application 111 requests the database 103 to read out the mail verification data stored in the process of S12 using the verification token (S17). The portal service application 111 obtains the tenant ID, the user ID, the contact mail address determined to be usable as the log-in mail address and the verification token stored in the database 103.

The portal service application 111 requests the authentication•certification unit 131 to validate the log-in mail address (S18). In the process of S18, the contact mail address determined to be usable as the log-in mail address may be managed by adding a flag or the like indicating that this address is used as the log-in mail address, for example.

Here, in the process of S18, the portal service application 111 may request the validation by designating the application authentication key, the tenant ID, the user ID and the log-in mail address. Here, the application authentication key is used for the authentication•certification unit 131 to confirm that the request is from the portal service application 111.

The user terminal 11 accepts, from the user, an input of a log-in mail address and a password in a log-in screen of the second service (S19). The user terminal 11 requests the portal service application 111 of the service platform providing system 40 to log in by designating the log-in mail address and the password (S20).

At the service platform providing system 40, the portal service application 111 requests the authentication•certification unit 131 to log in using the log-in mail address and the password obtained from the user terminal 11 (S21). In the process of S21, as the log-in mail address as the second authentication data is registered in the process of S18, it is assumed that the user is successfully logged in the second service.

By the process as described above, under a status that the first authentication data is previously registered, when setting the second authentication data, it is possible to register the log-in mail address as the user specifying data usable as the second authentication data from the user data of the user who uses the first service including the first authentication data. With this configuration, it is possible to manage user data of the user who uses the first service and the second service, for example.

Here, upon obtaining the first authentication data or the second authentication data from the user terminal 11 or the image forming apparatus 12, the service platform providing system 40 determines corresponding application 101 and the platform API 104. Further, it is possible for the service platform providing system 40 to authenticate by the common service 102 via the application 101 and the platform API 104.

(First User Data Screen)

Next, the first user data screen used in the sequence illustrated in FIG. 5 is explained. FIG. 6 is a view illustrating an example of the first user data screen. In a user data screen 200 illustrated in FIG. 6, "user name", "main mail address", "sub-mail address 1", "sub-mail address 2", "last name", "first name" "tenant", "role", "display language", "time zone", "password" and the like are illustrated as user data including first authentication data of a user who uses the first service.

In the user data screen 200 illustrated in FIG. 6, it is possible to input a main mail address, a sub-mail address 1 and a sub-mail address 2 as contact mail addresses, for example. Further, the user data screen 200 includes a "use for log in" button 201 for selecting a log-in mail address used as the second authentication data for each of the main mail address, the sub-mail address 1 and the sub-mail address 2.

For the example illustrated in FIG. 6, the main mail address is already registered as a contact mail address, and a status is illustrated in which the "use for log in" button 201 is capable of being selected. In the process of S8 in FIG. 5, the "use for log in" button 201 illustrated in FIG. 6 is selected by the user, for example. With this, as described above, whether the selected contact mail address is usable for the log-in mail address is determined.

(Message Indicating URL for Confirmation is Sent to Designated Mail Address)

When the contact mail address selected from the first user data screen is determined to be usable as the log-in mail address, a mail including the verification URL is sent to the mail address. FIG. 7 is a view illustrating an example of a message indicating URL for confirmation is sent to a designated mail address.

When the contact mail address selected in FIG. 6 is determined to be usable as the log-in mail address, for example, the message indicating that the URL for confirmation is sent to the designated mail address as illustrated in FIG. 7 is displayed on the user terminal 11. Here, when the verification URL (URL for confirmation) included in the sent mail is accessed by the user, a process of registering the selected contact mail address as the log-in mail address is performed.

Here, when the selected contact mail address is determined not to be usable as the log-in mail address, an error message including that the address cannot be selected as the log-in mail address, for example, is displayed on the user terminal 11.

(Example of First User Data Screen in which Release Button is Displayed)

When the selected contact mail address is registered as the log-in mail address from the first user data screen, a release button is displayed in the first user data screen. FIG. 8 is a view illustrating an example of the first user data screen in which a release button is displayed.

In the user data screen 200 illustrated in FIG. 8, "using for log in" is displayed for the main mail address. Further, the user data screen 200 includes a "release" button 202 for releasing the main mail address from being the log-in mail address as the second authentication data. When the "release" button 202 illustrated in FIG. 8 is selected, the first user data screen as illustrated in FIG. 6 is displayed, for example.

(Switching of Log-in Screens)

Figure 9:
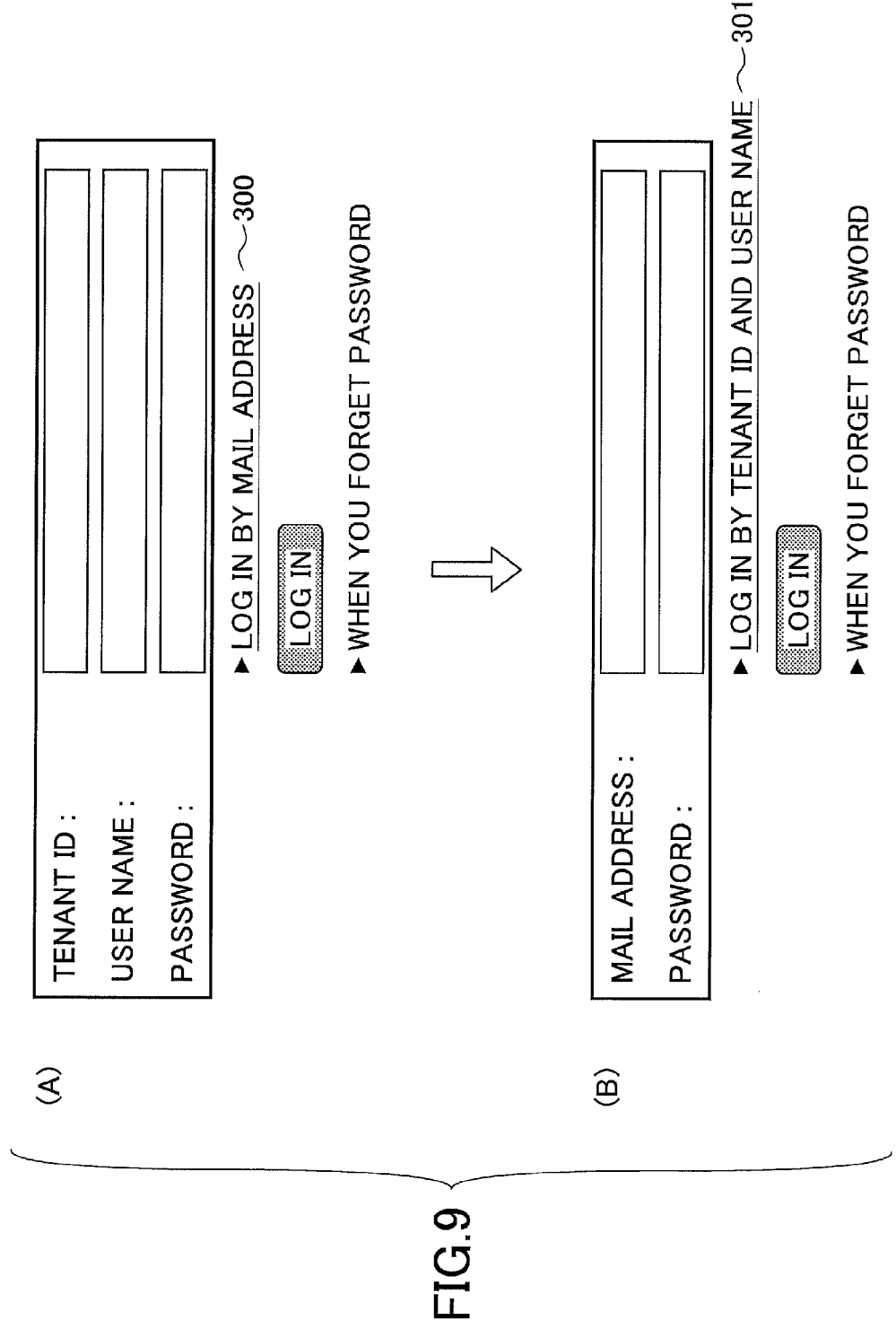
FIG. 9 is a view for explaining switching of log-in screens.

Next, switching of log-in screens for accepting inputs of the above described first authentication data and second authentication data is explained. FIG. 9 is a view for explaining switching of the log-in screens. (A) of FIG. 9 illustrates a log-in screen in which the first authentication data is capable of being input. (B) of FIG. 9 illustrates a log-in screen in which the second authentication data is capable of being input.

In the log-in screen illustrated in (A) of FIG. 9, input sections for inputting the tenant ID, the user name (user ID, for example) and the password as the first authentication data are illustrated, for example. Further, the log-in screen illustrated in (A) of FIG. 9 includes a "log in by mail address" button 300.

Further, in the log-in screen illustrated in (B) of FIG. 9, input sections for inputting the mail address and the password as the second authentication data are illustrated, for example. Further, the log-in screen illustrated in (B) of FIG. 9 includes a "log in by tenant ID and user name" button 301.

When the "log in by mail address button" button 300 is selected in the log-in screen illustrated in (A) of FIG. 9, the log-in screen illustrated in (B) of FIG. 9 is switched to be displayed. Further, when the "log in by tenant ID and user name" button 301 on the log-in screen illustrated in (B) of FIG. 9, the log-in screen illustrated in (A) of FIG. 9 is switched to be displayed.

As described above, by managing the first authentication data and the second authentication data in correspondence with each other, for example, the user who uses the first service and the second service can log in for using each of the services by switching the above described log-in screens.

(Process of Registering Log-in Mail Address)

Figure 10:
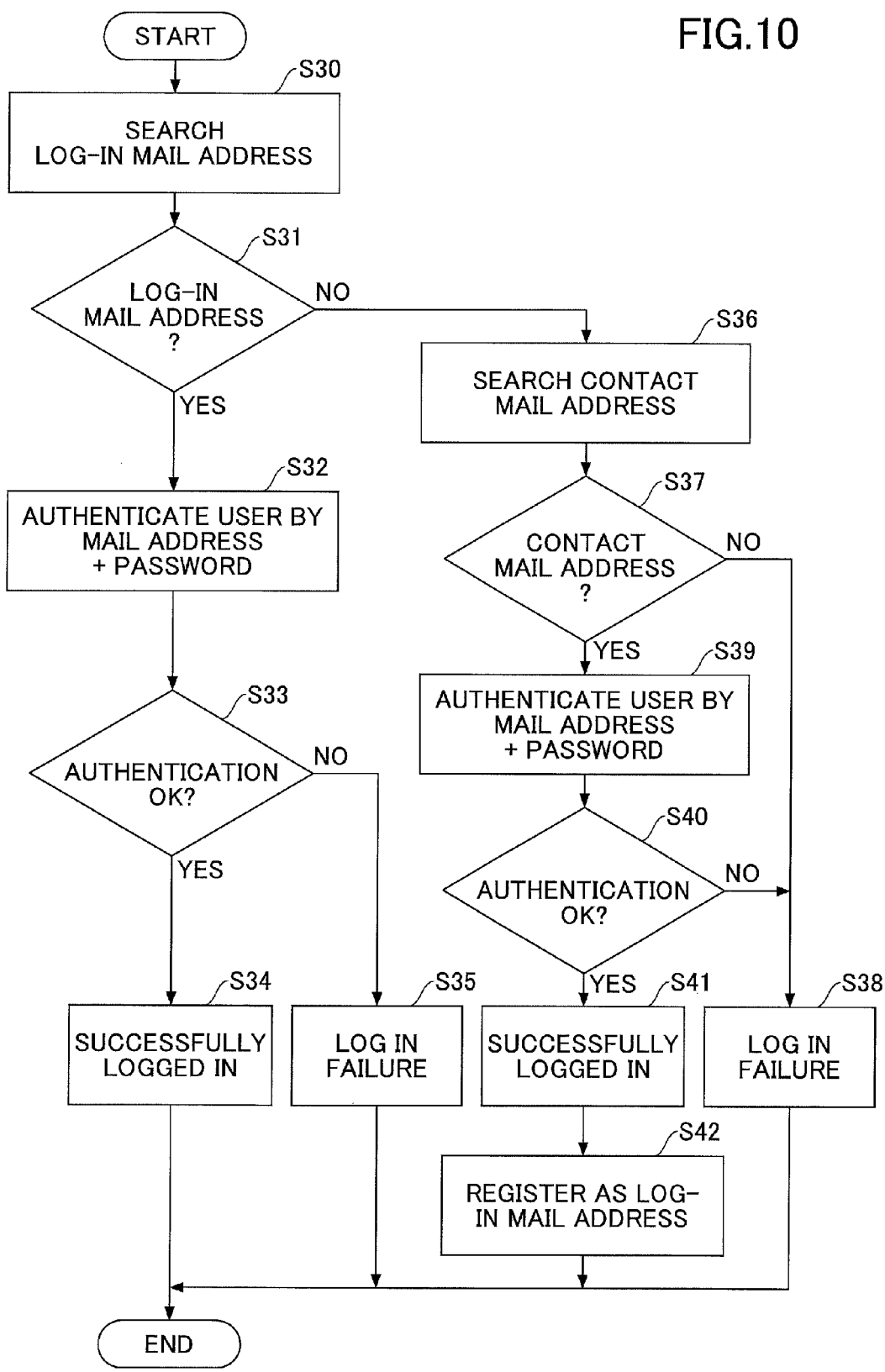
FIG. 10 is a flowchart illustrating an example of a process of registering a log-in mail address.

In the sequence illustrated in FIG. 5, the user can register (set) the log-in mail address by, after logging in by the first authentication data selecting the contact mail address used as the log-in mail address from the first user data screen. Alternatively, the log-in mail address may be automatically registered without causing efforts on the user for registration using the contact mail address input in the log-in screen illustrated in (B) of FIG. 9. FIG. 10 is a flowchart illustrating an example of a process of registering a log-in mail address.

For the example illustrated in FIG. 10, when a mail address is input in the log-in screen illustrated in (B) of FIG. 9, the portal service application 111 requests the authentication•certification unit 131 to refer to the database 103 and search the log-in mail address based on the input mail address, for example (S30).

For example, the portal service application 111 requests the authentication•certification unit 131 determined whether the input mail address is the log-in mail address (S31). When the authentication•certification unit 131 determines that the input mail address is the log-in mail address (YES of S31), the authentication•certification unit 131 authenticates the user using the mail address and the password input in the log-in screen illustrated in (B) of FIG. 9 (S32).

When the user is successfully authenticated (authentication OK) (YES of S33), the authentication•certification unit 131 determines that the user is successfully logged in (S34). Further, when it is determined that the authentication of the user is failure (NO of S33), the authentication•certification unit 131 determines that the log in is failure (S35).

On the other hand, in the process of S31, when the input mail address is determined not to be the log-in mail address (NO of S31), the authentication•certification unit 131 searches the contact mail address stored in correspondence with the tenant ID (S36). Here, it is assumed that the tenant ID is previously set with respect to the user terminal 11 or the image forming apparatus 12, for example.

The authentication•certification unit 131 determines whether the input mail address is the contact mail address registered in the user data, and usable (unique) as the log-in mail address, for example (S37). When the authentication•certification unit 131 determines that the contact mail address is usable as the log-in mail address (YES of S37), the authentication•certification unit 131 authenticates the user using the mail address and the password input in the log-in screen illustrated in (B) of FIG. 9 (S40).

When the user is determined to be successfully authenticated (authentication OK) (YES of S40), the authentication•certification unit 131 determines that the user is successfully logged in (S41). Further, the authentication•certification unit 131 stores the input mail address, in other words, the contact mail address determined to be usable as the log in mail in the process of address S37 as the log-in mail address (S42).

Here, in the process of S37, when it is determined that the input mail address is not the contact mail address usable as the log-in mail address (NO of S37), or it is determined that the user's authentication is failure in the process of S40 (NO of S40), it is determined that the log in was failure (S38), and the process is terminated.

By the above described registration process, the contact mail address input in the log-in screen can be automatically registered as the log-in mail address without causing efforts on the user for registration.

(Second User Data Screen)

Next, the second user data screen illustrating user data of a user who uses the second service including the second authentication data is explained. FIG. 11 is a view illustrating an example of the second user data screen.

In the user data screen 400 illustrated in FIG. 11, "mail address", "last name", "first name", "password" and the like are displayed as the user data of the user who uses the second service including the second authentication data, for example. The "mail address" indicates the log-in mail address. The user data screen 400 illustrated in FIG. 11 becomes capable of setting when the log-in mail address or the like of the user is registered as the second authentication data for using the second service.

Here, when the user data for using the second service is registered, in order to keep compatibility between the user data for using the first service, the log-in mail address may be registered as the contact mail address of the user data for using the first service. Further, user ID of the user data for using the first service may be set using random values. With this configuration, user data for using the first service can be registered after the user data for using the second service is registered.

According to the embodiment, convenience of a user can be improved.

Although a preferred embodiment of the data processing system, the data processing apparatus and the log in method has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

Here, the portal service application 111 and the authentication•certification unit 131 are an example of a determining unit. The tenant data storing unit 152 and the user data storing unit 153 are an example of a user data storing unit. The authentication•certification unit 131 and the user management unit 133 are an example of a management unit. The "use for log in" button 201 is an example of a selection accepting unit. The portal service application 111 is an example of a screen generating unit.

The present application is based on and claims the benefit of priority of Japanese Priority Application No. 2014-223358 filed on Oct. 31, 2014, the entire contents of which are hereby incorporated by reference.

What is claimed is:

1. A data processing system including a data processing apparatus, comprising:
a processor; and
a memory that stores user data of a user who uses a first service, the user data including a first item that is a part of first authentication data used for logging in the first service and a second item that is user specifying data of a type different from the first item,
the memory further storing instructions that, when executed, cause the processor to function as a screen generating unit that generates a log-in screen for accepting an input of at least a part of the first authentication data from a user terminal of the user, and causes the generated log-in screen to be displayed on the user terminal of the user,
an accepting unit that accepts an input of the first authentication data input via the log-in screen from the user terminal, of the user,
a determining unit that determines, when the user is successfully authenticated based on the first authentication data accepted by the accepting unit and sets second authentication data used for logging in a second service different from the first service which requires authentication data of a type same as the second item of the user data, whether the second item of the user data is usable as the second authentication data based on whether the second item of the user data is unique, and
a management unit that sets the second item determined to be usable as the second authentication data by the determining unit as the second authentication data, and manages the user data as user data of the user who uses the first service and the second service.

2. The data processing system according to claim 1, wherein the instructions, when executed, cause the screen generating unit to generate a first user data screen for displaying the user data of the user who uses the first service, when the user is successfully authenticated based on the first authentication data accepted by the accepting unit and sets the second authentication data used for logging in the second service, the second item being displayed in the first user data screen,
wherein the instructions, when executed, cause the accepting unit to accept a selection of the second item used as the second authentication data input via the first user data screen from the user terminal of the user, and
wherein the instructions, when executed, cause the determining unit to determine whether the second item accepted by the accepting unit is usable as the second authentication data.

3. The data processing system according to claim 2, wherein the instructions, when executed, cause the first user data screen to display a button to select the second item to be used as the second authentication data.

4. The data processing system according to claim 2, wherein the second item is mail address data of the user and the user data includes one or more mail address data.

5. The data processing system according to claim 1, wherein the instructions, when executed, cause the screen generating unit to further generate a second log-in screen for accepting an input of the second authentication data, respectively, and display the generated log-in screens in a switchable manner.

6. The data processing system according to claim 1, wherein the second item is mail address data,
wherein the first authentication data includes tenant data, data identifying a user, which is different from mail address data, and password data, and
wherein the second authentication data includes mail address data and password data.

7. A data processing apparatus comprising:
a processor; and
a memory that stores user data of a user who uses a first service, the user data including a first item that is a part of first authentication data used for logging in the first service and a second item that is user specifying data of a type different from the first item, the memory further storing instructions that, when executed, cause the processor to function as
- a screen generating unit that generates a log-in screen for accepting an input of at least a part of the first authentication data from a user terminal of the user, and causes the generated log-in screen to be displayed on the user terminal of the user,
- an accepting unit that accepts an input of the first authentication data input via the log-in screen from the user terminal of the user,
- a determining unit that determines, when the user is successfully authenticated based on the first authentication data accepted by the accepting unit and sets second authentication data used for logging in a second service different from the first service which requires authentication data of a type same as the second item of the user data, whether the second item of the user data is usable as the second authentication data based on whether the second item of the user data is unique, and
- a management unit that sets the second item determined to be usable as the second authentication data by the determining unit as the second authentication data, and manages the user data as user data of the user who uses the first service and the second service.

8. A log in method performed in a data processing system including a data processing apparatus,
the data processing system including
- a processor; and
- a memory that stores user data of a user who uses a first service, the user data including a first item that is a part of first authentication data used for logging in the first service and a second item that is user specifying data of a type different from the first item, the memory further storing instructions that, when executed, cause the processor to function as a screen generating unit, an accepting unit, a determining unit and a management unit, the log in method comprising:
- a step of generating a log-in screen for accepting an input of at least a part of the first authentication data from a user terminal of the user, and causing the generated log-in screen to be displayed on the user terminal of the user performed by the screen generating unit;
- a step of accepting an input of the first authentication data input via the log-in screen from the user terminal of the user performed by the accepting unit;
- a step of determining, when the user is successfully authenticated based on the first authentication data accepted by the accepting unit and sets second authentication data used for logging in a second service different from the first service which requires authentication data of a type same as the second item of the user data, whether the second item of the user data is usable as the second authentication data based on whether the second item of the user data is unique, performed by the determining unit; and
- a step of setting the second item determined to be usable as the second authentication data by the determining unit as the second authentication data, and managing the user data as user data of the user who uses the first service and the second service performed by the management unit.

* * * * *